UNITED STATES PATENT OFFICE

2,324,896
MIXED POLYMERIZATION PRODUCTS

Werner Zerweck and Wilhelm Kunze, Frankfort-on-the-Main-Fechenheim, Germany, assignors to General Aniline & Film Corporation, New York, N. Y., a corporation of Delaware No Drawing. Application February 6, 1941, Serial No. 377,662. In Germany January 27, 1940

9 Claims. (Cl. 260—86)

Our present invention relates to mixed polymerization products obtained by polymerizing according to usual methods a mixture of known polymerizable vinyl compounds, acrylic acid derivatives, styrole, butadiene and isobutylene on the one hand and a vinylsulfamide compound of the general formula:

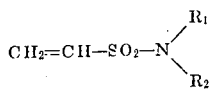

wherein $R_1$ stands for a member of the group consisting of alkyl-, aralkyl- and aryl radicles of the benzene series, $R_2$ stands for an alkylgroup and in the case of $R_1$ representing an aryl radicle of the benzene series for a member of the group consisting of hydrogen and an acylradicle of the aliphatic series and wherein $R_1$ and $R_2$ together with the nitrogen atom stand for the radicle of a heterocyclic ring system, on the other hand.

The mixed polymerization products thus formed are valuable products of a high molecular weight, which are suitable for many purposes, for instance as masses to be cast or pressed in the plastic industry, as binding agents for the production of moulded or laminated products, as adhesives, in the textile industry for dressing, matting and the like, agents in the textile industry as lacquer binding agents or additions to lacquers or as softening agents. The fact that vinylsulfamides of the aforesaid general formula are capable of polymerization (which needs as it is well known the presence of a double bond in the molecule) is surprising since according to "Berichte der Deutschen Chemischen Gesellschaft," vol. 34, page 3470, the unsaturated constitution of the aforesaid vinylsulfamide compounds is doubtful on account of the lack of the reactions which are typical for double bonds.

In order to further illustrate our invention the following examples are given, the parts being by weight and all temperatures in degrees centigrade.

Example 1

10 parts of acrylnitrile are well mixed with 3 parts of vinylsulfopiperidide of the formula:

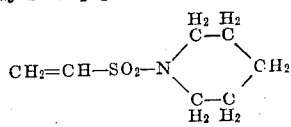

about 20 parts of water, a small amount of an emulsifying agent such as dibutylnaphthalene sulfonic acid, and 0.4 part of potassium persulfate. The mixture is heated to about 70° and held for about 20 hours at this temperature. After some time the mixed polymerization product separates and is isolated when cold. It is a colorless product insoluble in alcohol and benzene. It can be plasticized at temperatures above 200°. According to analysis it consists of a polymer containing 20 parts of polymerized vinylsulfopiperidide and 80 parts of polymerized acrylnitrile.

Example 2

A mixture of 10 parts of styrole, 5 parts of vinylsulfanilide of the formula:

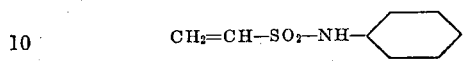

and 0.2 part of benzoylperoxide is heated for about 20 hours at about 100°. A product is obtained, which is soluble in benzene and can be precipitated from the benzenic solution by the addition of methanol. When repeating this procedure twice a mixed polymerization product melting at 170 to 180° is obtained. According to analysis it consists of a polymer containing 24 parts of polymerized vinylsulfanilide and 76 parts of polymerized styrole. When polymerizing a mixture of equal parts of styrole and vinylsulfanilide at about 120° a product is obtained which is not soluble in benzene but is only capable of swelling therein. By treatment with methanol ingredients of a low molecular weight can be removed. Then the product contains according to analysis 35 parts of polymerized vinylsulfanilide.

Example 3

A mixture of 10 parts of styrole, 5 parts of vinylsulfomethylanilide of the formula:

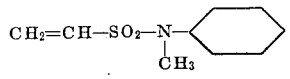

and 0.1 part of benzoylperoxide is heated for about 20 hours at about 120°. The product thus obtained is soluble in warm benzene and can be precipitated by pouring the benzenic solution into methanol. The colorless powder thus formed of melting point of 120 to 130° is a mixed polymerization product containing 22 parts of polymerized vinylsulfomethylanilide and 78 parts of polymerized styrole.

Example 4

A mixture of 20 parts of styrole, 8 parts of vinylsulfodimethylamide of the formula:

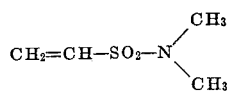

and 0.1 part of benzoylperoxide is heated for about 24 hours at about 95° in a nitrogen atmosphere. The formed mixed polymerization product is when cold a hard and transparent mass. It is soluble in benzene, methylenechloride and acetone. From such solutions it can be precipitated by the addition of methanol. It consists of 84 parts polymerized styrole and 16 parts of polymerized vinylsulfodimethylamide and melts at 145 to 155°.

Similar products are obtained when replacing vinylsulfodimethylamide for instance by vinylsulfodiethylamide or the corresponding dipropylamide or dibutylamide.

When styrole is replaced by corresponding quantities of vinylchloride there are obtained mixed polymerization products which are likewise suitable for the production of solid artificial masses.

*Example 5*

A mixture of 20 parts of acrylnitrile, 8 parts of vinylsulfodimethylamide, 1.5 parts of dibutylnaphthalene sulfonic acid, 50 parts of water and 0.5 part of potassium persulfate is warmed at first at 70°, then for about 25 hours held at about 80°. After some time the mixed polymerization product separates. It is filtered off when cold, washed out with water and alcohol and dried at about 80° in vacuo. It is a colorless powder insoluble in the usual solvents and has a very high softening point. It consists of 80 parts of polymerised acrylnitrile and 20 parts of polymerized vinylsulfodimethylamide. When starting from a mixture of 60 parts of vinylsulfodimethylamide and 40 parts of acrylnitrile the mixed polymerized product contains 33 parts of polymerized vinylsulfodimethylamide and 67 parts of polymerized acrylnitrile.

When replacing acrylnitrile by similar quanties of acrylic acid methylester the formed mixed polymerization products have the properties and the field of application of soft resins.

*Example 6*

A mixture of 25 parts of styrole, 10 parts of vinylsulfomethylbenzylamine of the formula:

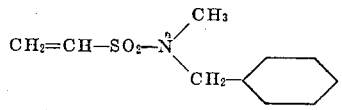

and 0.2 part of benzoylperoxide is heated for about 24 hours at about 95° in a nitrogen atmosphere. The formed mixed polymerization product is when cold a hard mass and may be freed from monomeric ingredients and those of a low molecular weight by dissolving in benzene and precipitating with methanol. The purified product melts at 135 to 140° and consists of 83 parts of polymerized styrole and 17 parts of polymerized vinylsulfomethylbenzylamide.

A similar mixed polymerization product melting at 140 to 150° is obtained when starting from vinylsulfodibenzylamide of the formula:

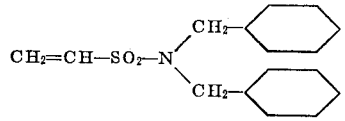

*Example 7*

A mixture of 10 parts of acrylnitrile, 10 parts of vinylsulf-acetanilide of the formula:

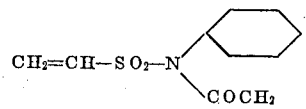

about 15 parts of water, a small amount of an emulsifying agent such as dibutylnaphthalene sulfonic acid and 0.5 part of potassium persulfate is slowly heated to 65 to 70° and held for about 20 hours at about 80°. The mixed polymerization product separates in solid form. It is isolated, washed out with hot alcohol, dried and pulverized.

It is colorless and insoluble in the usual solvents. According to analysis it consists of 62 parts of polymerized acrylnitrile and 38 parts of polymerized vinylsulfacetanilide.

When starting from 10 parts of acrylnitrile and 5 parts of vinylsulfacetanilide the formed mixed polymerization product contains 20% of the latter component.

*Example 8*

A mixture of 10 parts of styrole, 10 parts of vinylsulfacetanilide and 0.2 part of benzoylperoxide is slowly heated to about 100°, held for an hour at this temperature and subsequently heated for about 20 hours at about 140°. The formed mixed polymerization product is soluble in boiling benzene and can be separated from monomeric ingredients and those of a low molecular weight by precipitating a benzenic solution with methanol. According to analysis it consists of 35 parts of polymerized vinylsulfacetanilide and 65 parts of polymerized styrole.

When starting from 10 parts of styrole and 5 parts of vinylsulfacetanilide the polymerization product melts from 150 to 170°. It is soluble in warm benzene and contains 22.5% of polymerized vinylsulfacetanilide.

When replacing the vinylsulfacetanilide by a corresponding quantity of vinylsulf-propionanilide very similar mixed polymerization products are obtained.

We claim:

1. Mixed polymerization products obtained by polymerizing a vinyl sulfamide selected from the class consisting of those of the formulae

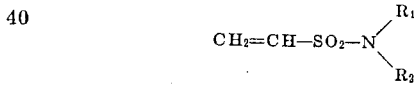

and

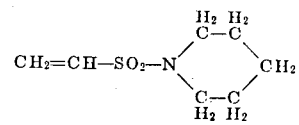

wherein $R_1$ is a member of the group consisting of alkyl, aralkyl and aryl of the benzene series, $R_2$ is a member of the group consisting of hydrogen, aliphatic acyl and alkyl, $R_2$ being one of the latter two members only when $R_1$ is aryl, with a different polymerizable vinyl compound.

2. The process of producing mixed polymerization products which comprises heating a vinyl sulfamide selected from the class consisting of those of the formulae:

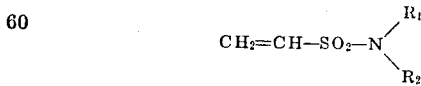

and

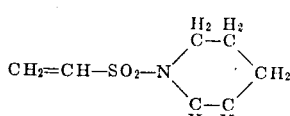

wherein $R_1$ is a member of the group consisting of alkyl, aralkyl and aryl of the benzene series, $R_2$ is a member of the group consisting of hydrogen, aliphatic acyl and alkyl, $R_2$ being one of the latter two members only when $R_1$ is aryl, with a different polymerizable vinyl compound.

3. The process as defined in claim 2 wherein the vinyl sulfamide is vinyl sulfopiperidide and the other polymerizable vinyl compound is acrylic nitrile.

4. The process as defined in claim 2 wherein the heating is effected in the presence of a peroxidic catalyst.

5. The process as defined in claim 2 wherein the vinyl sulfamide is vinyl sulfanilide and the other polymerizable compound is styrole.

6. The process as defined in claim 2 wherein the vinyl sulfamide is vinyl sulfomethylanilide and the other polymerizable compound is styrole.

7. Mixed polymerization products obtained by polymerizing vinylsulfopiperidide with acrylic nitrile.

8. Mixed polymerization products obtained by polymerizing vinylsulfanilide with styrole.

9. Mixed polymerization products obtained by polymerizing vinylsulfomethyl anilide with styrole.

WERNER ZERWECK.
WILHELM KUNZE.